United States Patent [19]
Block et al.

[11] Patent Number: 5,914,374
[45] Date of Patent: Jun. 22, 1999

[54] ADDITIVE FOR AQUEOUS COATING SYSTEMS

[75] Inventors: Vera Block, Bönen; Harald Borgholte, Münster; Uwe Meisenburg, Duisburg; Heinz-Peter Rink; Ludwig Moorkamp, both of Münster, all of Germany

[73] Assignee: BASF Coatings AG, Muenster-Hiltrup, Germany

[21] Appl. No.: 08/803,411

[22] Filed: Feb. 20, 1997

[51] Int. Cl.⁶ .............................. C08F 20/00; C08L 67/00
[52] U.S. Cl. .............................. 525/440; 528/59; 528/84; 528/85; 528/272; 528/296; 528/300; 528/301; 528/302; 528/306; 528/307; 528/308; 528/308.6; 524/601; 524/604; 524/606; 524/608
[58] Field of Search ........................ 572/272, 296, 572/300, 301, 302, 306, 307, 308, 308.6, 59, 84, 85; 525/440; 524/601, 604, 606, 608

[56] References Cited

U.S. PATENT DOCUMENTS

| | | |
|---|---|---|
| 4,151,152 | 4/1979 | Schmitt et al. . |
| 5,654,391 | 8/1997 | Göbel et al. ............................ 528/71 |
| 5,658,617 | 8/1997 | Göbel et al. ......................... 427/372.2 |

FOREIGN PATENT DOCUMENTS

| | | |
|---|---|---|
| 0 036 975 A2 | 3/1981 | European Pat. Off. . |
| 0 427 028 A1 | 10/1990 | European Pat. Off. . |
| 0 634 431 A1 | 7/1994 | European Pat. Off. . |
| 0 678 536 A1 | 4/1995 | European Pat. Off. . |
| 35 32 864 A1 | 4/1987 | Germany . |

*Primary Examiner*—Samuel A. Acquah

[57] ABSTRACT

A urethanized polyester is claimed which is suitable as an additive for aqueous coating systems, which is obtainable by, in a first reaction stage (A), subjecting (a) from 10 to 45 mol-% of one or more diols,
(b) from 5 to 50 mol-% of one or more polyols having at least 3 OH groups, and
(c) from 35 to 47 mol-% of one or more aromatic, aliphatic or cycloaliphatic polycarboxylic acids and/or reactive derivatives thereof to a polycondensation reaction in a manner known per se until the reaction mixture has an acid number of from 1 to 10, and, in a reaction stage (B), reacting the resulting reaction product in a manner known per se with an organic polyisocyanate. The urethanized polyester is outstandingly suitable as an additive for aqueous coating materials in order to improve the rheological stabilization of coating materials.

12 Claims, No Drawings

ADDITIVE FOR AQUEOUS COATING SYSTEMS

The present invention relates to a urethanized polyester which is suitable as an additive for coating formulations, especially aqueous coating formulations, and which improves the stability of these coatings in large-scale industrial plant.

In the course of the industrial coating of substrates, especially metal substrates such as automobile bodies, vessels, etc., the coating systems are usually passed from stock containers via pipeline systems into the coating apparatus. Where, for example, 2-component systems comprising coating materials and curing agents are employed, these are passed from separate stock containers via so-called ring mains, from which the components can be removed at any desired point.

In the course of transportation via these ring mains, the components of the coating material undergo shear gradients and differences in flow rates. It has been found that these phenomena lead to an instability of the coating systems, and the appearance of the applied and stoved coatings is impaired.

Accordingly, the object of the present invention was to provide an additive for coating systems, especially aqueous coating systems, which is capable of improving the stability of coating materials which are passed through large-scale industrial plants, especially via pipelines (ring mains).

The present invention provides a urethanized polyester which is suitable as an additive for aqueous coating systems, which is obtainable by, in a first reaction stage (A), subjecting (a) from 10 to 45 mol-% of one or more diols, (b) from 5 to 50 mol-% of one or more polyols having at least 3 OH groups, and (c) from 35 to 47 mol-% of one or more aromatic, aliphatic or cycloaliphatic polycarboxylic acids and/or reactive derivatives thereof to a polycondensation reaction in a manner known per se until the reaction mixture has an acid number of from 1 to 10, and, in a reaction stage (B), reacting the resulting reaction product in a manner known per se with one or more organic polyisocyanates.

It has surprisingly been found that the urethanized polyester is outstandingly suitable as an additive for aqueous coating materials in order to improve the rheological stabilization of coating materials. Through the addition of the novel polyesters, the rheological properties of the coating systems are altered such that even lengthwise loads on the coating materials as a result of shear events in the ring main produce no significant drop in viscosity which would lead to poor coating results.

The present invention also provides a process for preparing urethanized polyesters, wherein, in a reaction stage (A), (a) from 10 to 45 mol-% of one or more diols, (b) from 5 to 50 mol-% of one or more polyols having at least 3 OH groups, and (c) from 35 to 47 mol-% of one or more aromatic, aliphatic or cycloaliphatic polycarboxylic ac ids and/or reactive derivatives thereof are subjected to a polycondensation reaction in a manner known per se until the reaction mixture has an acid number of from 1 to 10, and, in a reaction stage (B), the resulting reaction product is reacted in a manner known per se with one or more organic polyisocyanates.

The polyols used for preparing the polyesters consist, for example, of alkylene glycols, such as ethylene glycol, propylene glycol, butylene glycol, 1,4-butanediol, 1,6-hexanediol, neopentyl glycol, neopentyl glycol hydroxypivalate, and diols, such as dimethylolcyclohexane. Also suitable are aliphatic polyetherdiols, such as linear or branched poly(oxyethylene) glycols, poly(oxypropylene) glycols and/or poly(oxybutylene) glycols, and mixed polyetherdiols, such as poly(oxyethyleneoxypropylene) glycols. The polyetherdiols usually have a molar mass Mn of from 400 to 3000.

Other diols which can be employed are aromatic or alkyl-aromatic diols, for example 2-alkyl-2-phenylpropane-1,3-diol, bisphenol derivatives with ether functionality, etc.

Other suitable diols are esters of hydroxycarboxylic acids with diols, where the diol employed can be the abovementioned diols. Examples of hydroxycarboxylic acids are hydroxypivalic acid or dimethylolpropanoic acid.

The diols can be employed alone or as a mixture of different diols.

As a further reactant in reaction stage (A), polyols having at least 3 OH groups are added. Examples of polyols having at least 3 OH groups are trimethylolpropane, trimethylolethane, glycerol, pentaerythritol, dipentaerythritol, trishydroxyethyl isocyanate, 1,2,4-butanediol, propanetriols and hexanetriols, trihydroxycarboxylic acids, such as trishydroxy-methyl(ethyl)ethanoic acids.

The polyols having at least 3 OH groups can be employed alone or as a mixture.

Examples which may be mentioned of polycarboxylic acids which can be employed as components (c) are aromatic, aliphatic and cycloaliphatic polycarboxylic acids. As component (c) it is preferred to employ aromatic and/or aliphatic polycarboxylic acids. Reactive derivatives which can be mentioned are, in particular, the anhydrides, where they exist.

Examples of suitable polycarboxylic acids are phthalic acid, isophthalic acid, terephthalic acid, halophthalic acid, such as tetrachloro- and/or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endomethylenehexahydrophthalic acid, camphoric acid, cyclohexanetetracarboxylic acid, cyclobutanetetracarboxylic acid, etc. The cycloaliphatic polycarboxylic acids can be employed in their cis form and in their trans form and as a mixture of both forms. Also suitable are the esterifiable derivatives of the abovementioned polycarboxylic acids, for example their mono- or polyesters with aliphatic alcohols having 1 to 4 carbon atoms or hydroxy alcohols having 1 to 4 carbon atoms.

The components (a), (b) and (c) are preferably employed in molar ratios such that the polyol units, i.e. the diols and the polyols having at least 3 OH groups in total, and the sum of the polycarboxylic acid units, are employed in a ratio of from 0.8:1 to 1.6:1.

The preparation of the polyester in step (A) takes place in accordance with the known methods of esterification (cf. various standard works, for example:

1. Temple C. Patton, Alkyd Resin Technology, Interscience Publishers John Wiley & Sons, New York, London 1962;

2. Dr. Johannes Scheiber, Chemie und Technologie der k ünstlichen Harze, Wissenschaftliche Verlagsgesellschaft mbH., Stuttgart, 1943;

3. Hans Wagner+Hans-Friedrich Sarx, Lackkunstharze, 4th edition, Carl Hanser Verlag, Munich, 1959;
4. Ullmanns Encyklopädie der technischen Chemie, Volume 14, pages 80 to 106 (1963)).

In this context, the reaction usually takes place at temperatures between 180 and 280° C., in the presence or absence of an appropriate esterification catalyst, for example lithium octoate, dibutyltin oxide, dibutyltin dilaurate, p-toluenesulfonic acid and the like.

The preparation of the polyesters in step (A) is normally carried out in the presence of small amounts of an appropriate solvent as entrainer. Examples of entrainers employed are aromatic hydrocarbons, especially xylene and (cyclo) aliphatic hydrocarbons, for example cyclohexane.

The condensation reaction is preferably carried out up to a conversion where the reaction mixture has an acid number of from about 1 to 10, preferably from 1 to 5. The condensation products can be linear or branched.

Before further reaction with an organic isocyanate, the polyester obtained in reaction step (A) is diluted with a solvent, which advantageously does not intervene in the reaction, to a solids content of from 50 to 90%. Suitable solvents include glycol ethers, such as ethylene glycol dimethyl ether, glycol ether esters, such as ethylglycol acetate, butylglycol acetate, 3-methoxy-n-butyl acetate, butyldiglycol acetate, methoxypropyl acetate, esters, such as butyl acetate, isobutyl acetate, amyl acetate, ketones, such as methyl ethyl ketone, methyl isobutyl ketone, diisobutyl ketone, cyclohexanone and isophorone. In addition it is also possible to employ aromatic hydrocarbons, such as xylene, and aliphatic hydrocarbons.

In reaction step (B) the polyester obtained in (A) is reacted in a manner known per se with an organic polyisocyanate, i.e. is urethanized. As polyisocyanate component it is possible to use any organic polyisocyanates having free isocyanate groups attached to aliphatic, cycloaliphatic, araliphatic and/or aromatic structures. Preference is given to employing polyisocyanates having 2 to 5 isocyanate groups per molecule. If desired it is also possible to add small amounts of organic solvent to the polyisocyanates, preferably from 1 to 25% by weight based on pure polyisocyanate, in order thus to improve the ease of incorporation of the isocyanate. Solvents suitable as additives for the polyisocyanates are, for example, ethoxyethyl propionate, butyl acetate and the like.

Examples of suitable isocyanates are described in "Methoden der organischen Chemie", Houben-Weyl, Volume 14/2, 4th edition, Georg Thieme Verlag, Stuttgart 1963, pages 61 to 70, and by W. Siefken, Liebigs Ann. Chem. 562, 75 to 136.

Suitable examples are 1,2-ethylene diisocyanate, 1,4-tetramethylene diisocyanate, 1,6-hexamethylene diisocyAnate 2,2,4- and 2,4,4-trimethyl-1,6-hexamethylene diisocyanate, 1,12-dodecane diisocyanate, ω,ω'-diisocyanatodipropyl ether, cyclobutane 1,3-diisocyanate, cyclohexane 1,3- and 1,4-diisocyanate, 2,2- and 2,6-diisocyanato-1-methylcyclohexane, 3-isocyanatomethyl-3,5,5-trimethylcyclohexyl isocyanate (isophorone diisocyanate), 2,5- and 3,5-bis(isocyanatomethyl)-8-methyl-1,4-methanodecahydronaphthalene, 1,5-, 2,5-, 1,6- and 2,6-bis(isocyanato)-4,7-methanohexahydroindane, dicyclohexyl 2,4'- and 4,4'-diisocyanate, 2,4- and 2,6-hexahydrotolylene diisocyanate, perhydro-2,4'- and -4,4'-diphenylmethane diisocyanate, ω,ω'-diisocyanato-1,4-diethylbenzene, 1,3- and 1,4-phenylene diisocyanate, 4,4'-diisocyanatobiphenyl, 4,4'-diisocyanato-3,31-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenylbiphenyl, 2,4'- and 4,4'-diisocyanatodiphenylmethane, naphthylene 1,5-diisocyanate, tolylene diisocyanates, such as 2,4- and 2,6-tolylene diisocyanate, N,N'-(4,4'-dimethyl-3,3'-diisocyanatodiphenyl)uretdione, m-xylylene diisocyanate, dicyclohexylmethane diisocyanate, tetramethylxylylene diisocyanate, but also triisocyanates, such as 2,4,4'-triisocyanatodiphenyl ether, 4,4',4"-triisocyanatotriphenylmethane. Preference is given to employing, alone or in combination with the abovementioned polyisocyanates, polyisocyanates containing isocyanurate groups and/or biuret groups and/or allophanate groups and/or urethane groups and/or uretdione groups and/or urea groups. Polyisocyanates containing urethane groups, for example, are obtained by reacting some of the isocyanate groups with polyols, for example trimethylolpropane and glycerol.

Preference is given to employing aliphatic or cycloaliphatic polyisocyanates, especially hexamethylene diisocyanate, dimerized and trimerized hexamethylene diisocyanate, isophorone diisocyanate, dicyclohexylmethane 2,4'-diisocyanate or dicyclohexylmethane 4,4'-diisocyanate, tetramethylxylylene diisocyanate or mixtures of these polyisocyanates. Very particular preference is given to the use, as polyisocyanates, of mixtures of polyisocyanates which are based on hexamethylene diisocyanate and contain uretdione and/or isocyanurate groups and/or allophanate groups, as are formed by catalytic oligomerization of hexamethylene diisocyanate using appropriate catalysts. The polyisocyanate component may otherwise alternatively consist of any desired mixtures of the polyisocyanates mentioned by way of example.

In a further preferred embodiment the polyisocyanate component employed can be a pre-adduct, which is the reaction product of one of the abovementioned polyisocyanates with a polyol component, preferably a (poly) hydroxycarboxylic acid. Isocyanate-terminal products are particularly preferred as pre-adducts. Examples of polyol components which are employed as starting compounds for preparing the pre-adduct are diols, for example dimethylolpropionic acid, trishydroxy(alkyl)alkanoic acids, hydroxypivalic acid. The use of such a reaction product makes it possible to introduce hydrophilic or hydrophobic groups into the polyisocyanate component by way of the selection of the starting components for preparing this polyisocyanate component. If, for example, a dihydroxycarboxylic acid is employed as diol component, then it is possible to introduce a carboxyl group into the diisocyanate component.

The quantitative ratios of the reaction components in step B, i.e. of the polyesters obtained in step A and the polyisocyanate component, can be chosen over wide ranges and as a function of the reaction components. The individual components are advantageously employed in proportions such that the resulting product gives a stable dispersion. The components are preferably employed in amounts such that the OH groups are in excess relative to the NCO groups. Where the polyester component from step A contains no hydrophilic segments, such as polyether components, it is preferred to react up to 1.1 molar parts of polymeric polyesters per mole of NCO, so that there is an NCO:OH ratio ≦1. Where a polymeric polyester containing hydrophilic segments is employed, then it is also possible to employ more than 1.1 molar parts of polyester per NCO equivalent.

The novel polyester obtained in step B preferably has an OH number of between 50 and 400, particularly preferably between 50 and 250 and, in particular, between 50 and 150. The acid number of the product is generally between 0 and 100. Where the molecule contains no polyether segments, or only small proportions of such segments, the acid number is usually over 20. The acid number is preferably below 60, in particular between 20 and 60 and, with particular preference, between 25 and 40. If suitable polyether components are also present, the acid number may also be less than 20. The OH number and the acid number can be established, for example, by appropriate selection of the monomers and/or by the ratio of NCO groups to OH groups.

The urethanization reaction in step B takes place in a manner known per se at elevated temperature. Preferably, and especially when the polyisocyanate component also includes further reactive groups, for example carboxyl groups, the urethanization should be carried out at a temperature below 130° C., preferably below 100° C.

The urethanization reaction is preferably carried out up to a high conversion; the isocyanate content of the resulting reaction product is preferably below 0.5, in particular below 0.1%. Following the reaction, the reaction mixture is neutralized with a base. For the neutralization it is possible to employ ammonia and/or amines (especially alkylamines), amino alcohols and cyclic amines, such as di- and triethylamine, dimethylaminoethanolamine, diisopropanol amine, morpholine, N-alkylmorpholine. Highly volatile amines are preferred for the neutralization.

The reaction product obtained in reaction step B, the novel urethanized polyester, can be worked up in a manner known per se after the end of the reaction and subjected to final processing.

After the end of the reaction, the reaction mixture is preferably first of all diluted with water and the organic solvent is removed under vacuum. The solid content of the mixture can be adjusted with water. The mixture is preferably adjusted to a solids content of from 35% to 65%. The pH of a dispersion of this kind that has been obtained is between 6.4 and 7.5.

The novel urethanized polyester is outstandingly suitable as an additive for all customary aqueous coating materials, especially for 1-component waterborne coating materials, 2-component waterborne coating materials, and physically drying waterborne coating materials. With particular preference, it is added as an additive to coatings for the OEM finishing of automobiles.

The present invention additionally provides, accordingly, for the use of the urethanized polyester described above as an additive for aqueous coating materials in order to improve the Theological stability.

EXAMPLES

A. Preparation Example for Urethanized Polyester
1. Polyester Precursor

For 1 kg of polyester, 128.9 g of neopentyl glycol, 318.9 g of neopentyl glycol hydroxypivalate, 166.0 g of trimethylolpropane, 205.5 g of isophthalic acid, 40 g of xylene and 254.3 g of hexahydrophthalic anhydride were weighed into a steel apparatus which is suitable for polycondensation reactions, and were continuously heated, and the water of condensation was removed continuously. When the product had an acid number of 3, the reaction was ended and the mixture was cooled to 100° C. and diluted with methyl ethyl ketone (MEK) to 80% solids (viscosity 50% strength in MEK: 0.2 Pas).

2. Urethanized Polyester Dispersion 1

488.4 g of meta-tetramethylxylyl diisocyanate, 134.1 g of dim.ethylolpropionic acid and 568.0 g of methyl ethyl ketone were weighed into a steel reactor which is suitable for polyaddition reactions, and were heated to 80° C. At a constant isocyanate content of 7.4% based on the mixture employed, the reaction mixture was cooled to 50° C., and 2110 g of the polyester solution were added. This mixture was subsequently heated to 80° C. At an isocyanate content <0.1% and a viscosity of 3.6 dPas (10:3 in N-methylpyrrolidone), the batch was neutralized with 71.2 g of N,N-dimethylethanolamine. The neutralized batch was then diluted with water, and the organic solvent was removed under vacuum. Finally, a solids content of 49.2% was established with deionized water. The pH of dispersion was 6.8. The dispersion was free from bittiness, was homogeneous, and was stable on storage at 50° C. for at least 8 weeks.

3. Urethanized Polyester Resin Solution 1

The procedure was initially as for the preparation of the urethanized polyester resin dispersion, with the difference that the MEK was replaced by isopropoxypropanol by means of vacuum distillation. The solution was adjusted to a solids content of 64.9% with isopropoxypropanol.

The product has a pH of 7.4 and a viscosity of 3.9 dPas (10:3 in methylpyrrolidone).

We claim:

1. A urethanized polyester obtained by reacting a polyester that is the reaction product of:
   (a) from 10 to 45 mol-% of one or more diols,
   (b) from 5 to 50 mol-% of one or more polyols having at least 3 OH groups, and
   (c) 35 to 47 mol-% of one or more polycarboxylic acids selected from the group consisting of aromatic, aliphatic, and cycloaliphatic polycarboxylic acids and reactive derivatives thereof, and mixtures thereof,
wherein said polyester has an acid number of from 1 to 10, with an organic polyisocyanate, wherein the urethanized polyester is stable in an aqueous dispersion.

2. A urethanized polyester as claimed in claim 1, wherein said diols are selected from the group consisting of alkylene glycols, aliphatic polyether diols, aromatic and alkylaromatic diols, esters of hydroxycarboxylic acids with diols, and mixtures thereof.

3. A urethanized polyester as claimed in claim 1, wherein said polyols having at least three OH groups are selected from the group consisting of trimethylolpropane, trimethylolethane, glycerol, pentaerythritol, dipentaerythritol, tris-hydroxyethyl isocyanate, 1,2,4-butanetriol, propanetriols, hexanetriols, trihydroxycarboxylic acids, trishydroxymethyl(ethyl)-ethanoic acids, and mixtures thereof.

4. A urethanized polyester as claimed in claim 1, wherein said polycarboxylic acids are selected from the group consisting of phthalic acid, isophthalic acid, terephthalic acid, halophthalic acids, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endomethylenehexahydrophthalic acid, camphoric acid, cyclohexanetetracarboxylic acid, cyclobutanetetracarboxylic acid, and mixtures thereof.

5. A urethanized polyester as claimed in claim 1, wherein the polyester and the polyisocyanate component are employed in quantitative proportions such that the OH groups are in an excess relative to the NCO groups.

6. A urethanized polyester as claimed in claim 1, wherein the urethanized polyester has an acid number of between 0 and 100.

7. A urethanized polyester as claimed in claim 1, wherein the urethanized polyester has an OH number of between 50 and 400.

8. A urethanized polyester as claimed in claim 1, wherein said organic polyisocyanate has from 2 to 5 isocyanate groups per molecule.

9. A urethanized polyester as claimed in claim 1, wherein said organic polyisocyanate is an adduct of a polyisocyanate and a polyol component.

10. A process for preparing a urethanized polyester, comprising the steps of
   (A) preparing a polyester by reaction of
      (a) from 10 to 45 mol-% of one or more diols,
      (b) from 5 to 50 mol-% of one or more polyols having at least 3 OH groups, and
      (c) from 35 to 47 mol-% of one or more polycarboxylic acids selected from the group consisting of aromatic, aliphatic, and cycloaliphatic polycarboxylic acids and reactive derivatives thereof, and mixtures thereof,
   wherein said polyester has an acid number of from 1 to 10; and
   (B) reacting said polyester with an organic polyisocyanate to produce a urethanized polyester which is stable in an aqueous dispersion.

11. An aqueous coating material, comprising a urethanized polyester obtained by reacting a polyester that is the reaction product of:
   (a) from 10 to 45 mol-% of one or more diols,
   (b) from 5 to 50 mol-% of one or more polyols having at least 3 OH groups, and
   (c) from 35 to 47 mol-% of one or more polycarboxylic acids selected from the group consisting of aromatic, aliphatic, and cycloaliphatic polycarboxylic acids and reactive derivatives thereof, and mixtures thereof,
wherein said polyester has an acid number of from 1 to 10, with an organic polyisocyanate, wherein said urethanized polyester is present in an amount sufficient to improve the rheological stability of the coating material.

12. A method of improving the rheological stability of an aqueous coating material, comprising adding to an aqueous coating material an additive comprising a urethanized polyester, wherein the urethanized polyester is stable in an aqueous dispersion and is obtained by reacting a polyester (A) with a polyisocyanate (B), wherein the polyester (A) has an acid number of from 1 to 10 and is obtained by reaction of
   (a) from 10 to 45 mol-% of one or more diols,
   (b) from 5 to 50 mol-% of one or more polyols having at least 3 OH groups, and
   (c) from 35 to 47 mol-% of one or more polycarboxylic acids selected from the group consisting of aromatic, aliphatic, and cycloaliphatic polycarboxylic acids and reactive derivatives thereof, and mixtures thereof.

* * * * *